United States Patent
Wilson et al.

(10) Patent No.: US 9,664,113 B2
(45) Date of Patent: May 30, 2017

(54) ONE PIECE INLET LIP SKIN DESIGN

(71) Applicant: The Boeing Company, Chicago, IL (US)

(72) Inventors: Ronnie Wilson, Summerville, SC (US); Alan D. Stemple, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 436 days.

(21) Appl. No.: 14/214,723

(22) Filed: Mar. 15, 2014

(65) Prior Publication Data

US 2015/0260104 A1 Sep. 17, 2015

(51) Int. Cl.
*F02C 7/04* (2006.01)
*F02C 7/20* (2006.01)
*B64D 33/02* (2006.01)
*B64D 29/06* (2006.01)

(52) U.S. Cl.
CPC ............... *F02C 7/20* (2013.01); *B64D 29/06* (2013.01); *B64D 33/02* (2013.01); *F02C 7/04* (2013.01); *Y10T 29/49229* (2015.01)

(58) Field of Classification Search
CPC ... F02C 7/04; F02C 7/20; B64D 33/02; B64D 2033/0286; B64D 2033/0273; B64D 29/00; Y10T 137/0947; B64C 7/02; F01D 9/00; F01D 25/24; F01D 25/26; F01D 25/28
See application file for complete search history.

(56) References Cited

U.S. PATENT DOCUMENTS

| | | | |
|---|---|---|---|
| 6,328,258 B1 | 12/2001 | Porte | |
| 2010/0124494 A1 | 5/2010 | Howarth et al. | |
| 2011/0168852 A1* | 7/2011 | Porte | B64C 21/10 244/53 B |
| 2012/0318924 A1* | 12/2012 | Porte | B64D 33/02 244/134 D |
| 2015/0129045 A1 | 5/2015 | Kane et al. | |

FOREIGN PATENT DOCUMENTS

| | | |
|---|---|---|
| EP | 1582702 A1 | 10/2005 |
| EP | 2241504 A2 | 10/2010 |
| EP | 2441676 A1 | 4/2012 |

* cited by examiner

*Primary Examiner* — Christopher Besler
(74) *Attorney, Agent, or Firm* — Felix L. Fischer

(57) ABSTRACT

An aircraft engine inlet incorporates a lip skin having a skin web with a plurality of stiffeners integrally extending from the skin web. An aft edge land integrally extends from the skin web at an outer rim and an inner edge land integrally extends from the skin web at an inner rim. A central land integrally extends from the skin web with the plurality of stiffeners extending between said aft edge land and the central land.

19 Claims, 9 Drawing Sheets

ONE PIECE INLET LIP SKIN DESIGN

BACKGROUND INFORMATION

Field

Embodiments of the disclosure relate generally to aircraft structures and more particularly to embodiments for a one piece inlet skin having integral structural stiffeners on the inner mold line.

Background

Current aircraft structures for nacelle and engine cowlings employ skin elements stiffened with attached structural frames having a desired cross section for necessary support of the skin. Attachment of such structural frames requires numerous fasteners and creates significant time in assembly. Lip skins are critical aerodynamic surfaces and it is generally understood that a long lip skin is advantageous to preclude the necessity for a joint with the outer barrel far forward where disruption of the laminar flow region of the lip skin may occur. With the distance between the forward bulkhead outer attachment and the lipskin to outer barrel attachment being quite long, common practice has been to use a circumferential stiffener fastened to the inner mold line (IML) of the lipskin between the two joints to stiffen the panel. Such stiffeners have the problem that they are fastened with countersunk fasteners and the fasteners themselves, even though they are countersunk, cause disruptions in smoothness of the skin and disrupt laminar flow. Moreover, mechanically fastened stiffeners tend to be quite tall and are not integral to the skin, which may cause a large temperature difference between the outside of the skin and the inner chord of the stiffener when there is a thermal gradient. Also, a complete circumferential stiffener around the entire lip skin is heavy in order to have adequate stiffness for a step loading. However, the complete circumferential stiffener has been preferable since having only a partial circumferential stiffener and ending the stiffener in the middle of a panel may not provide desired fatigue properties. A mechanically fastened longitudinal stiffener results in similar problems with disrupting laminar flow and typically requires fasteners even farther forward than a circumferential ring stiffener.

It is therefore desirable to provide structurally simpler means of stiffening lip skins without aerodynamic impacts.

SUMMARY

Exemplary embodiments provide an aircraft engine inlet incorporating a lip skin having a skin web with a plurality of stiffeners integrally extending from the skin web. An aft edge land integrally extends from the skin web at an outer rim and an inner edge land integrally extends from the skin web at an inner rim. A central land integrally extends from the skin web with the plurality of stiffeners extending between said aft edge land and the central land.

A method for fabricating the embodiments described includes forming a lip skin by spin forming with a thickness at least as thick as a thickest land or stiffener. A pattern of lands and stiffeners is determined to meet structural requirements for aerodynamic and step loads. The lands and stiffeners are then formed integrally in the lip skin.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments described herein provide an integrally stiffened engine cowling lip for a large multiengine aircraft. A lip skin is formed by aluminum spinning and machined to provide longitudinal stiffeners on an outer circumferential rim extending from an aft edge land to a central land with a cutout pad up for access panel attachment. The lip skin is interconnected to an outer barrel of the engine inlet at the aft edge land on the outer circumferential rim and on an inner edge land on an inner circumferential rim. A forward bulkhead extends between the central land and the inner edge land. The interconnection of the aft edge land and outer barrel may be accomplished with a T-chord. An inner barrel of the engine inlet is interconnected to the inner edge land. An inner flange on the forward bulkhead may be employed to span the inner edge land and a companion forward edge land (mating surface) on the inner barrel. For exemplary embodiments the inner barrel may be a multiple ply laminate. An aft bulkhead extends between an aft end of the outer barrel and inner barrel.

Figure 1:
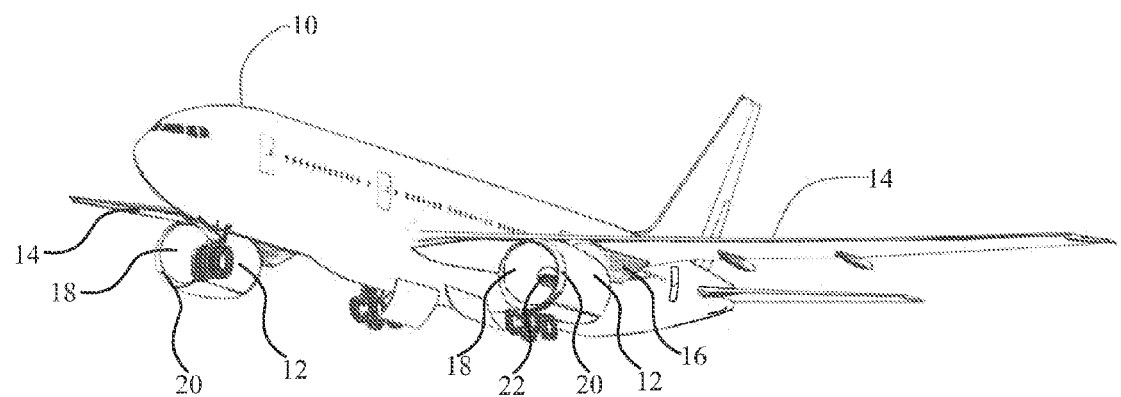
FIG. 1 is a pictorial view of an example aircraft on which the present embodiments may be employed.
Figure 2A:
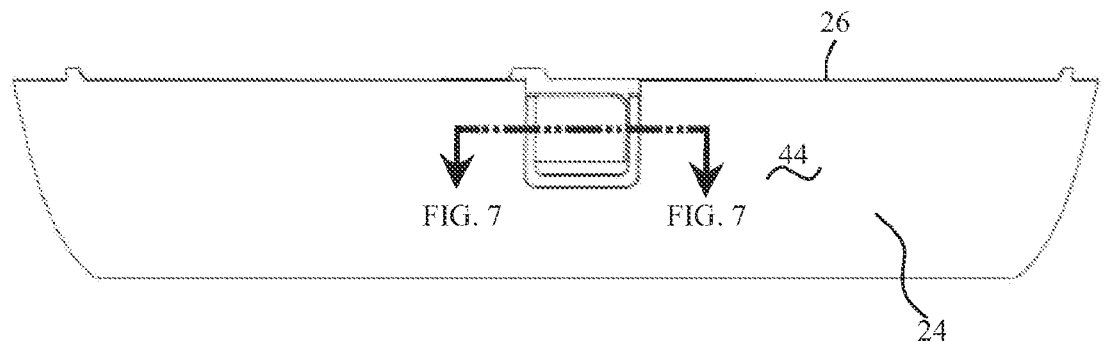
FIG. 2A is a bottom view of the lip skin.
Figure 2B:
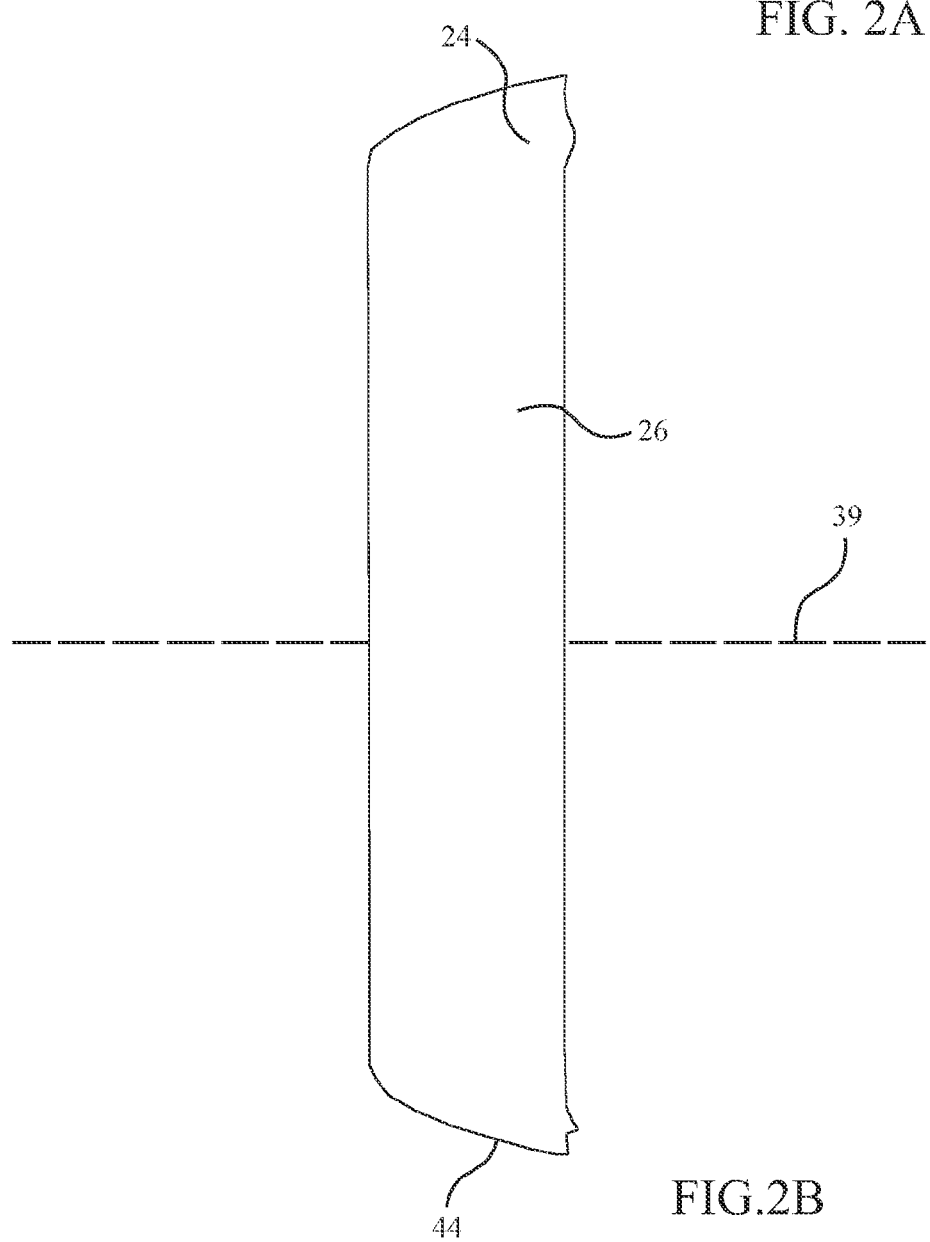
FIG. 2B is a side view of the lip skin.
Figure 3:
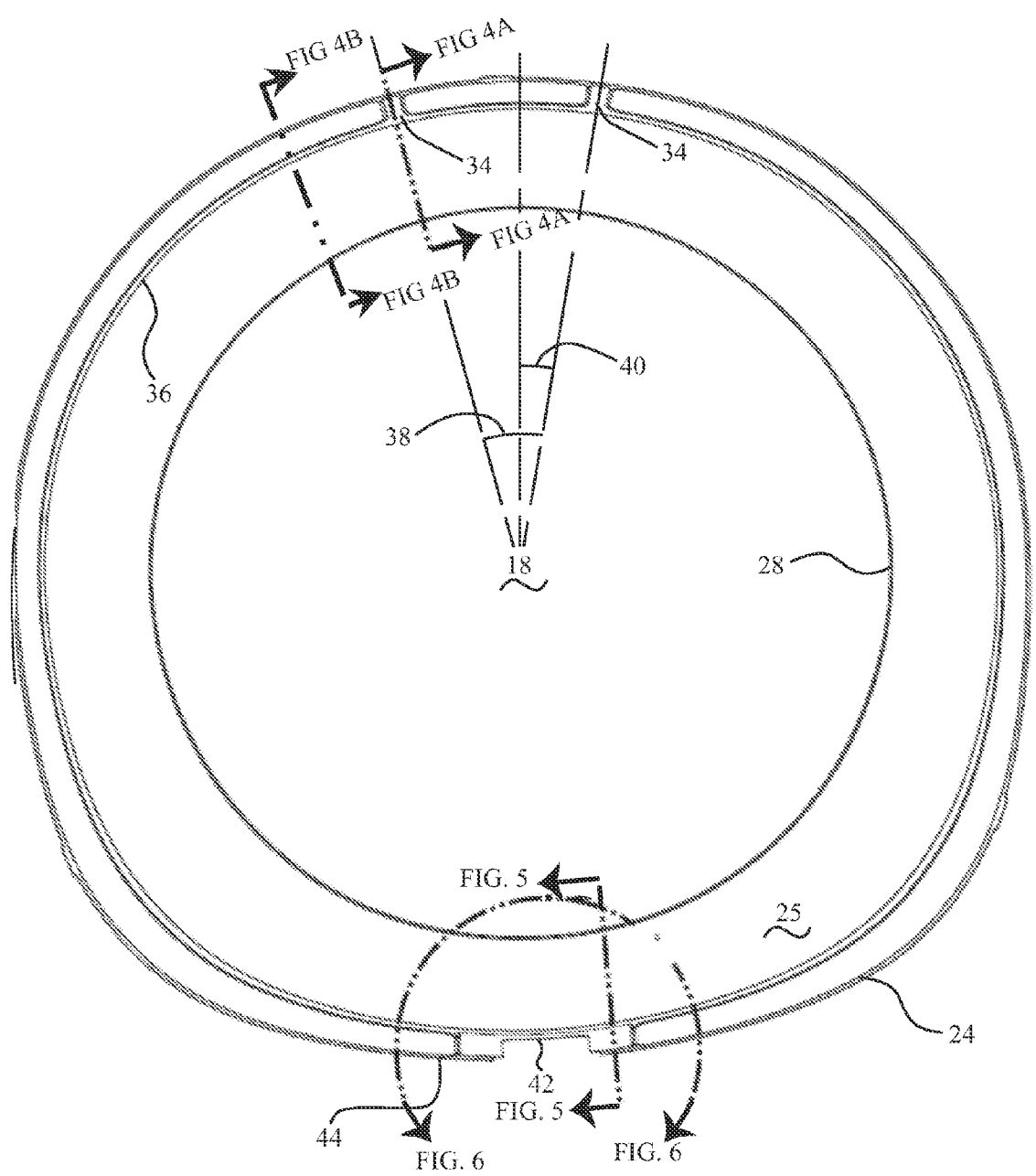
FIG. 3 is a rear view of the lip skin showing the interior surface.

Referring to the drawings, FIG. 1 shows an example aircraft 10 on which the embodiments disclosed herein may be employed. For the example shown, the aircraft 10 has two engine nacelles 12 supported from the wings 14 by pylons 16. Each nacelle 12 has an inlet aperture 18 surrounded by a lip 20 providing an aerodynamic leading edge for the inlet for a turbofan engine 22. The external surface of the lip 20 is provided by a lip skin 24. The lip skin 24 is shown in FIGS. 2A, 2B and 3. The lip skin 24 has an outer rim 26 and an inner rim 28.

Figure 4A:
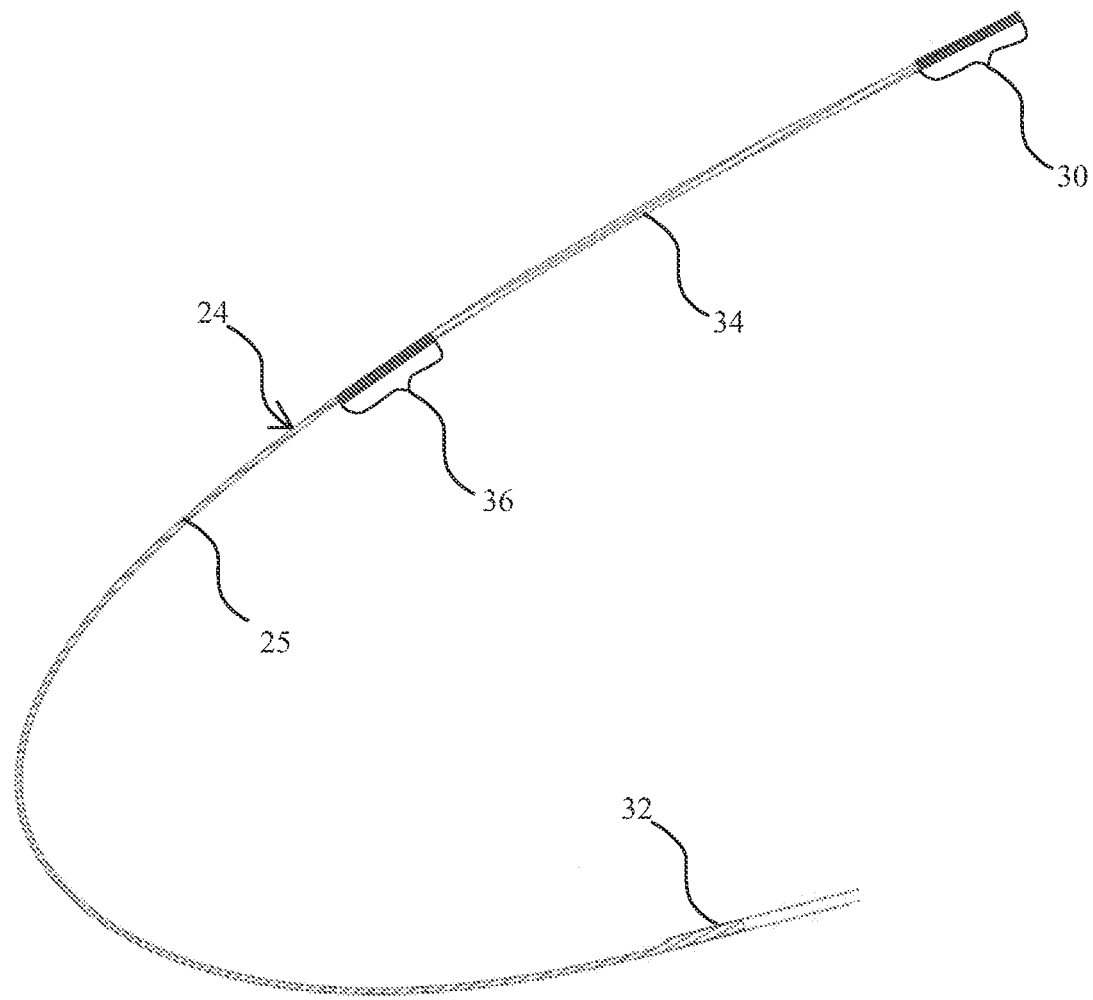
FIG. 4A is a section view along line 4A-4A in FIG. 3 showing the relative thickness of the integral stiffeners on the lip skin inner mold line (IML)
Figure 4B:
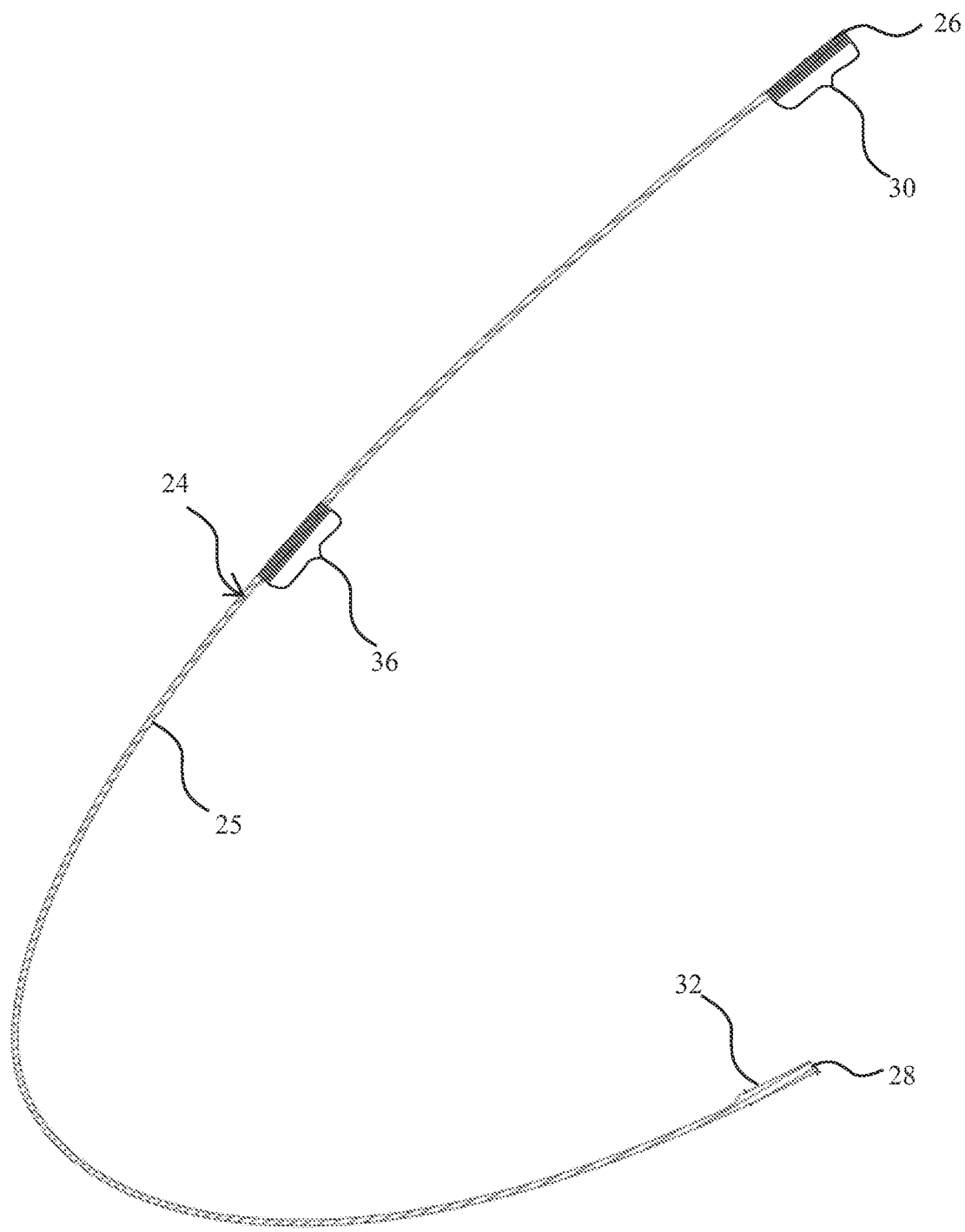
FIG. 4B is a section view along line 4B-4B in FIG. 3 showing the relative thickness of the aft edge land and central land on the lip skin IML.
Figure 5:
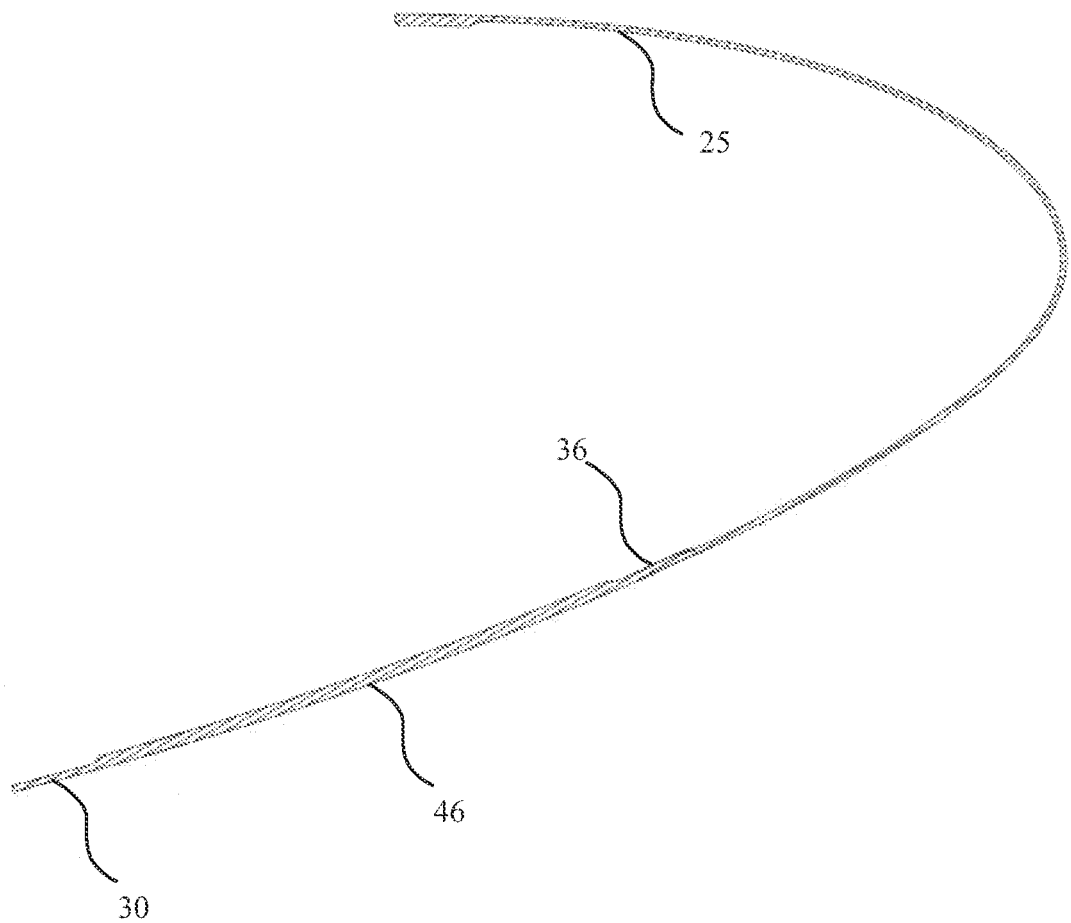
FIG. 5 is a section view along line 5-5 in FIG. 3.
Figure 6:
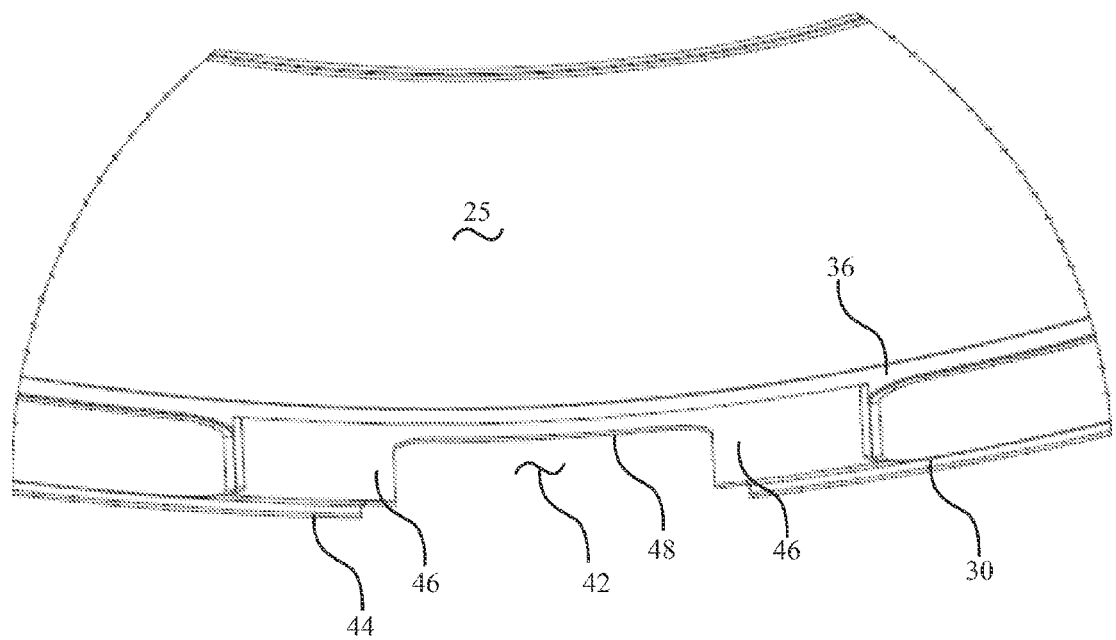
FIG. 6 is a detailed planar view of the area referenced by circle 6-6 in FIG. 3.

As seen in FIGS. 4A, 4B and 5 the lip skin 24 terminates at the outer rim 26 in an aft edge land 30 which extends substantially around the rim. The lip skin 24 terminates at the inner rim in an inner edge land 32. To provide longitudinal stiffness and eliminate the requirement for additional internal structural elements, machined stiffeners 34 (best seen in FIGS. 3 and 4A) extend from the aft edge land 30 forward to a central land 36 which extends around the circumference of the lip skin 24. The stiffeners 34, extending substantially fore and aft, interengaged with the aft edge land 30 and central land 36 provide stiffness in the lip skin 24 sufficient for aerodynamic loading of the lip skin and to provide sufficient strength for a "step zone" on the upper surface of the lip skin. While two stiffeners are shown in the embodiment in the drawings additional stiffeners may be employed in alternative embodiments. The aft edge land 30, inner edge land 32, central land 36 and stiffeners 34 are integral to the lip skin 24.

Forming of the lip skin to provide the integral lands and stiffeners is accomplished, by spinning of a lip skin blank having a wall thickness at least as thick as the thickest land or other formed feature as will be described in greater detail subsequently. Material in the lip skin is then removed by machining or chemical milling to provide the lands and, stiffeners leaving a skin web 25 with various intermediate features. The lands and stiffeners may be machined to a common thickness or varying thicknesses depending on structural requirements. For the exemplary embodiment the aft edge land 30, stiffeners 34 and central land 36 are approximately 0.125 inches in thickness while the inner edge land 32 is approximately 0.1740 inches in thickness with a nominal thickness of the skin web 25 of the lip skin 24 at 0.080 inches. The aft edge land 30 width is approximately 1.50 inches, the stiffener width approximately 1.50 inches while the inner edge land 32 width is approximately 1.070 inches. The stiffeners 34 extend a length of approximately 11.07 inches forward from the outer rim 26. Thicknesses of the lands and stiffeners may be varied along their length to accommodate predetermined load distributions on the lip skin 24. Further, the lands and stiffeners may be positioned symmetrically or asymmetrically within the inner mold line of the lip skin 24.

The stiffeners and lands as integrally formed in the skin are low-profile only requiring an increase in skin thickness of between about 50% and 120%. Additionally, the low profile stiffeners being integral to the skin have less thermal resistance across the thickness of the skin and stiffener. The integral stiffeners and lands eliminate the requirement for mechanical fasteners along the outer portion of the lip skin from the leading edge all the way back until the connection with an outer barrel as will be described subsequently. This increased smoothness allows maintaining a longer distance of laminar flow on the lip skin and reduced drag. The pattern of fore-aft stiffeners is radially asymmetric about the axis of the jet engine for the embodiment shown with a clocking angle 38 relative to an axis 39 of the inlet of approximately 25 degrees between the stiffeners and an offset angle 40 of approximately 11 degrees (as seen in FIG. 3). The integral lands and stiffeners in the lip skin 24 require fewer parts for ultimate assembly and therefore assembly may be accomplished faster.

Figure 7:
FIG. 7 is a section view along line 7-7 in FIG. 2A.

For the embodiment of the lip skin 24 shown in the drawings, additional structural features may be added to the skin employing the fabrication technique described. As shown in FIGS. 3, 5, 6 and 7, a cutout 42 extending forward from the outer rim 26 on a lower surface 44 of the lip skin 24 may be structurally accommodated with an additional pad up thickness 46 extending from the all edge land 30 to the central land 36 and encompassing the cutout 42. As best seen in FIG. 7, a cutout rim 48 having a thickness substantially similar to the overall skin web 25 thickness is provided surrounding the cutout 42. The pad up thickness 46 extends laterally from the cutout rim 48, approximately 3.02 inches for the example embodiment, with a thickness of approximately 0.18 inches to provide the predetermined structural strength.

Figure 8:
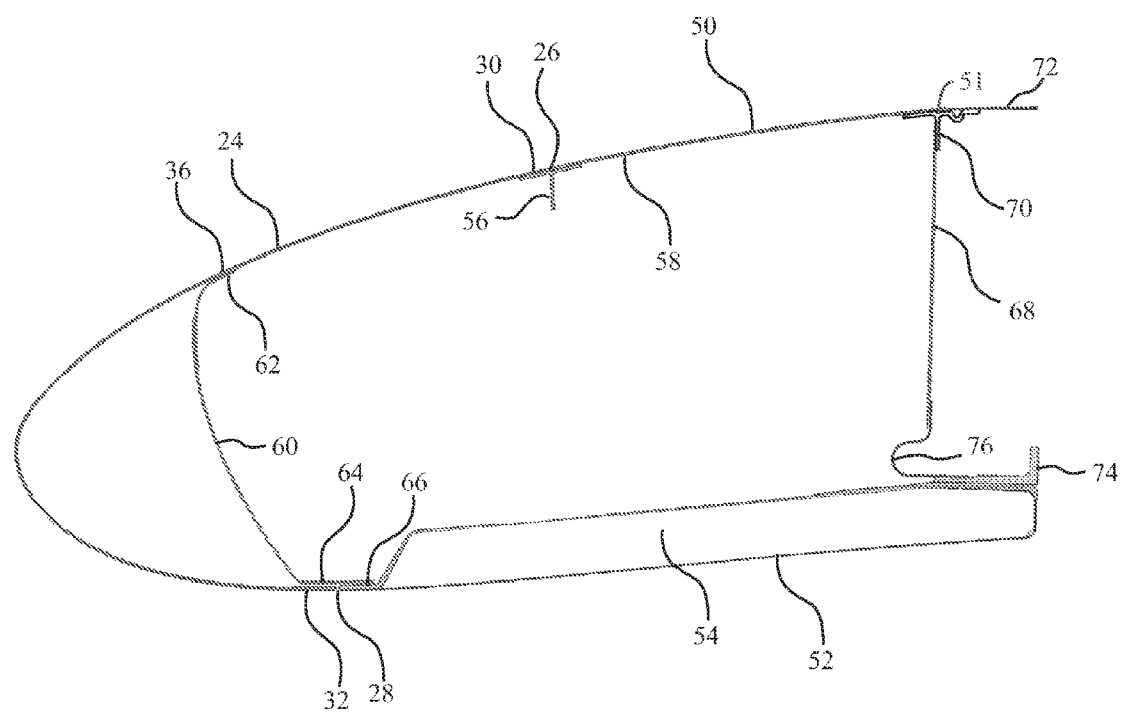
FIG. 8 is a section view of the lip skin as assembled to the outer barrel of the engine inlet structure.

The lip skin 24 is assembled as a portion of the inlet of the nacelle 12 as shown in FIG. 8. Outer rim 26 of the lip skin 24 is abutted against a forward edge of an outer barrel 50 while the inner rim 28 is abutted against a forward edge of an inner barrel 52. For the embodiment shown, inner barrel 52 is a multiple laminate structure with a core 54. A circumferential T-chord stringer 56 is employed to engage the aft edge land 30 and an inner surface 58 of the outer barrel 50. A forward bulkhead 60 is attached at an outer periphery 62 to the central land 36. An inner flange 64 on the forward bulkhead spans and interconnects the inner edge land 32 and a mating surface 66 on the inner barrel 52 extending aft from the forward edge. An aft bulkhead 68 extends between the outer barrel 50 and inner barrel 52. A T-V chord stringer 70 is employed to join an aft edge of 51 the outer barrel 50, aft bulkhead 68 and an external nacelle skin 72. The inner barrel 52 is attached to internal nacelle structure, having similar design to prior art nacelles, with an L bracket 74. A beaded inner attach angle 76 is employed to connect the aft bulkhead 68 to the L bracket 74.

Figure 9:
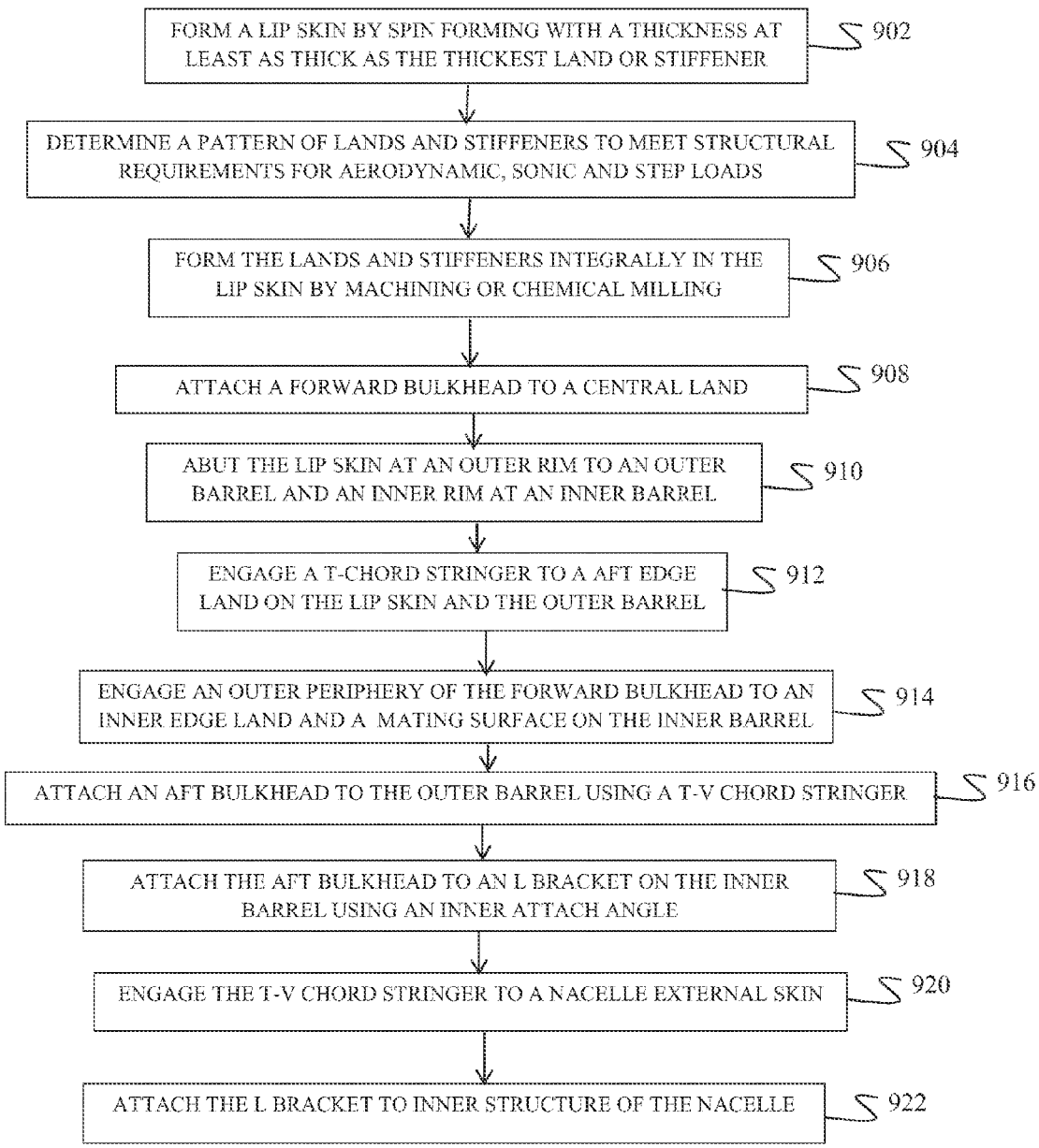
FIG. 9 is a flow chart of a cart cooling method enabled by the disclosed embodiments.

Fabrication of a nacelle inlet employing a one piece inlet lip skin as disclosed, in the embodiments herein is accomplished as shown in FIG. 9. A lip skin is formed by spin forming with a thickness at least as thick as the thickest land or stiffener, step 902. A pattern of lands and stiffeners is determined to meet structural requirements for aerodynamic, sonic and step loads, step 904. The lands and stiffeners are formed integrally in the lip skin by machining or chemical step 906. As determined by the structural requirements, the lands and stiffeners may have a single thickness or varying thicknesses. A forward bulkhead is attached to a central land, step 908, and the lip skin is abutted at an outer rim to an outer barrel and an inner rim at an inner barrel, step 910. A T-chord stringer is engaged to a aft edge land on the lip skin and the outer barrel, step 912 and an outer periphery of the forward bulkhead is engaged to an inner edge land and a mating surface on the inner barrel, step 914 thereby fastening the lip skin to the inner and outer barrels. An aft bulkhead is then attached to the outer barrel using a T-V chord stringer, step 916, and to an L bracket on the inner barrel using an inner attach angle, step 918. The T-V chord stringer is then engaged to a nacelle external skin, step 920 and the L bracket is attached to the internal nacelle structure, step 922, to complete the engine inlet.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An aircraft engine net comprising:
    a lip skin having
    a skin web;
    a plurality of stiffeners integral to and extending from the skin web;
    an aft edge land integral to and extending from the skin web at an outer rim;
    an inner edge land integral to and extending from the skin web at an inner rim;
    a central land integral to and extending from the skin web, said plurality of stiffeners extending longitudinally fore and aft between said aft edge land and said central land; and
    a forward bulkhead engaged between the central land and the inner edge land.

2. The aircraft engine inlet as defined in claim 1 wherein the plurality of integral stiffeners comprises two stiffeners and the stiffeners extend substantially fore and aft on the skin web.

3. The aircraft engine inlet as defined in claim 1 wherein the stiffeners are asymmetrically located about an inlet axis.

4. The aircraft engine inlet as defined in claim 3 wherein the stiffeners are located at an offset angle of about 11 degrees from vertical.

5. The aircraft engine inlet as defined in claim 4 where in the stiffeners are separated by a clocking angle of about 25 degrees.

6. The aircraft engine inlet as defined in claim 1 further comprising an inner barrel, said inner barrel abutting the inner rim and said forward bulkhead having an inner flange spanning and connecting the inner edge land and a mating surface on the inner barrel.

7. The aircraft engine inlet as defined in claim 6 further comprising an outer barrel abutting the outer rim and a first stringer engaging the aft edge land and outer barrel.

8. The aircraft engine inlet as defined in claim 7 further comprising an aft bulkhead inter connected to a second stringer and an aft edge of the outer barrel.

9. The aircraft engine inlet as defined in claim 8 further comprising a bracket attaching the inner barrel to internal nacelle structure and an inner attach angle engaging the aft bulkhead and the bracket.

10. A method for fabricating an engine inlet comprising:
   forming a lip skin by spin forming with a thickness at least as thick as a thickest land or stiffener;
   determining a pattern of lands and stiffeners to meet structural requirements for aerodynamic, sonic, and step loads;
   forming an aft edge land, an inner edge land, a central land and a plurality of stiffeners integrally in the lip skin extending from a skin web pursuant to the determined pattern, said plurality of stiffeners extending longitudinally fore and aft between the aft edge land and the central land;
   wherein the aft edge land extends from an outer rim of the skin web and the inner edge land extends from an inner rim of the skin web; and
   attaching a forward bulkhead between the central land and the inner edge land.

11. The method as defined in claim 10 wherein the step of forming further comprises machining the plurality of lands and stiffeners integrally in the lip skin.

12. The method as defined in claim 10 wherein the step of forming further comprises chemical milling the plurality of lands and stiffeners integrally in the lip skin.

13. The method as defined in claim 11 wherein the plurality of lands and stiffeners are machined to a common thickness.

14. The method as defined in claim 11 wherein the plurality of lands and stiffeners are machined to differing thicknesses.

15. The method as defined in claim 10 further comprising:
   abutting the lip skin at an outer rim to an outer barrel and an inner rim at an inner barrel.

16. The method as defined in claim 15 further comprising engaging a first stringer to the aft edge land on the lip skin and the outer barrel.

17. The method as defined in claim 16 further comprising engaging an outer periphery of the forward bulkhead to a mating surface on the inner barrel.

18. The method as defined in claim 17 further comprising attaching an aft bulkhead to the outer barrel using a second stringer and to an L bracket on the inner barrel using an inner attach angle.

19. The method as defined in claim 18 further comprising attaching the L bracket to internal nacelle structure and the second stringer to an external skin of the nacelle.

* * * * *